US011040822B1

(12) United States Patent
McCloud

(10) Patent No.: US 11,040,822 B1
(45) Date of Patent: Jun. 22, 2021

(54) DEVICE FOR HOLDING A RACKING CANE

(71) Applicant: John Edwin McCloud, Wickliffe, OH (US)

(72) Inventor: John Edwin McCloud, Wickliffe, OH (US)

(*) Notice: Subject to any disclaimer, the term of this patent is extended or adjusted under 35 U.S.C. 154(b) by 0 days.

(21) Appl. No.: 16/821,782

(22) Filed: Mar. 17, 2020

Related U.S. Application Data

(60) Provisional application No. 62/820,198, filed on Mar. 18, 2019.

(51) Int. Cl.
| | | |
|---|---|---|
| *A47K 1/08* | (2006.01) |
| *B65D 83/32* | (2006.01) |
| *C12G 1/00* | (2019.01) |
| *B65D 83/42* | (2006.01) |
| *C12G 1/036* | (2006.01) |

(52) U.S. Cl.
CPC ............. *B65D 83/32* (2013.01); *B65D 83/42* (2013.01); *C12G 1/005* (2013.01); *C12G 1/0206* (2013.01)

(58) Field of Classification Search
CPC ......... B65D 83/32; B65D 83/42; C12G 1/005
See application file for complete search history.

(56) References Cited

U.S. PATENT DOCUMENTS

| | | | | |
|---|---|---|---|---|
| 2,243,796 A | | 5/1941 | Fay et al. | |
| 2,459,246 A | * | 1/1949 | Sinclair | A61G 7/0503 |
| | | | | 248/214 |
| 2,469,292 A | * | 5/1949 | Cornwell | A47G 19/2222 |
| | | | | 215/391 |
| 3,760,711 A | * | 9/1973 | Webster | C12G 1/0206 |
| | | | | 99/277.1 |
| 5,697,129 A | * | 12/1997 | Newville | B25F 1/02 |
| | | | | 24/339 |
| D391,636 S | * | 3/1998 | Zwerk | D24/128 |
| 5,839,711 A | | 11/1998 | Bieck et al. | |
| 5,913,450 A | * | 6/1999 | Runkel | B44D 3/128 |
| | | | | 220/696 |
| 5,954,247 A | | 9/1999 | Savine et al. | |
| 6,230,905 B1 | | 5/2001 | Camblor | |
| 6,237,360 B1 | | 5/2001 | Corona | |
| 6,932,942 B2 | | 8/2005 | Itoh | |
| 7,322,482 B2 | | 1/2008 | Caradonna | |
| 8,082,680 B2 | | 12/2011 | Ives et al. | |
| 8,196,763 B2 | | 6/2012 | Greenberg | |

(Continued)

OTHER PUBLICATIONS

"BioClamps™: High Quality Plastic Sanitary Clamps", Avantor Fluid Handling Website, Web page <http://www.pawbio.com/clamps.html#.Xue4ZmDsZPY>, 5 pages, dated at least as early as Dec. 3, 2018, retrieved from www.pawbio.com website on Jun. 15, 2020.

(Continued)

*Primary Examiner* — Amy J. Sterling
(74) *Attorney, Agent, or Firm* — The Law Office of Patrick F. O'Reilly III, LLC

(57) ABSTRACT

A device for holding a racking cane is disclosed herein. The device includes a base component, the base component configured to be attached to a neck of a carboy; and a clip component coupled to the base component, the clip component configured to hold a racking cane steady relative to the carboy, the clip component being adjustable relative to the base component so as to allow a position and/or angle of the racking cane to be adjusted by a user.

20 Claims, 14 Drawing Sheets

(56) References Cited

U.S. PATENT DOCUMENTS

| | | |
|---|---|---|
| 8,272,545 B1 | 9/2012 | Saffran |
| 9,192,883 B1 * | 11/2015 | Blichmann ............... B30B 9/22 |
| 2012/0255928 A1 | 10/2012 | Greenberg |
| 2017/0001850 A1 | 1/2017 | Rider et al. |
| 2017/0253361 A1 | 9/2017 | Tu et al. |

OTHER PUBLICATIONS

"Siphon Clamp for Oversize Siphon Rod", The Home Vintner Website, Web page <http://www.thehomevintner.com/shoppingcart.php>, 2 pages, dated at least as early as Dec. 3, 2018, retrieved from www.thehomevintner.com website on Jun. 15, 2020.

"Hidapipe Double Pipe Clip 15mm", Low Cost Plumbing Supplies Website, Web page <https://www.lowcostplumbingsupplies.co.uk/plumbing-c8/pipe-trunking-c57/hidapipe-double-pipe-clip-15mm-9340>, 4 pages, dated at least as early as Dec. 3, 2018, retrieved from www.lowcostplumbingsupplies.co.uk website on Jun. 15, 2020.

\* cited by examiner

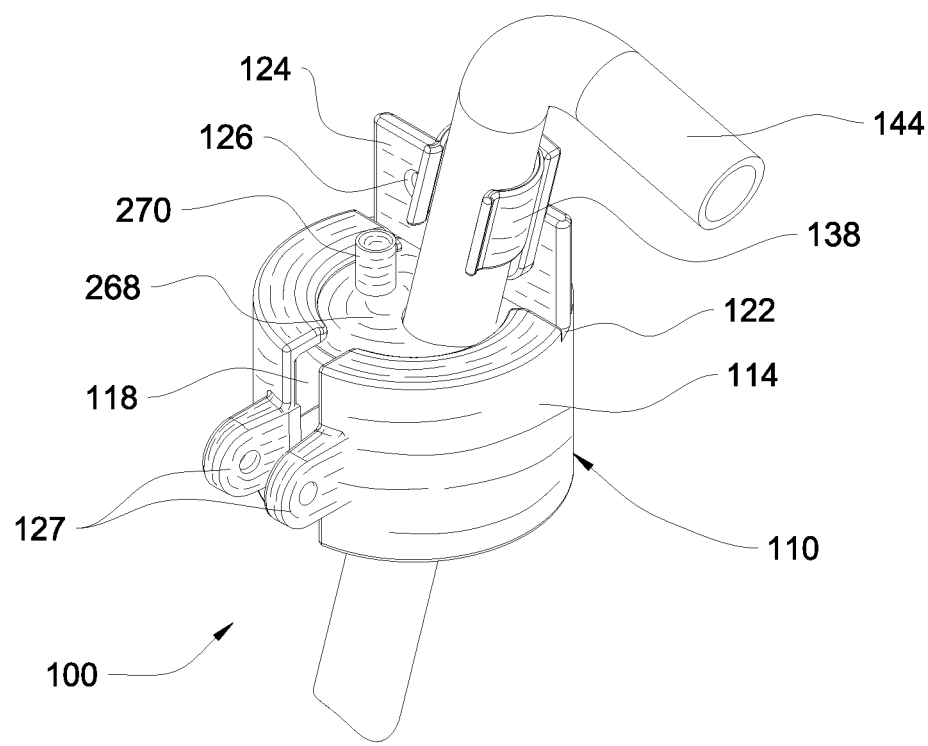
FIG. 29
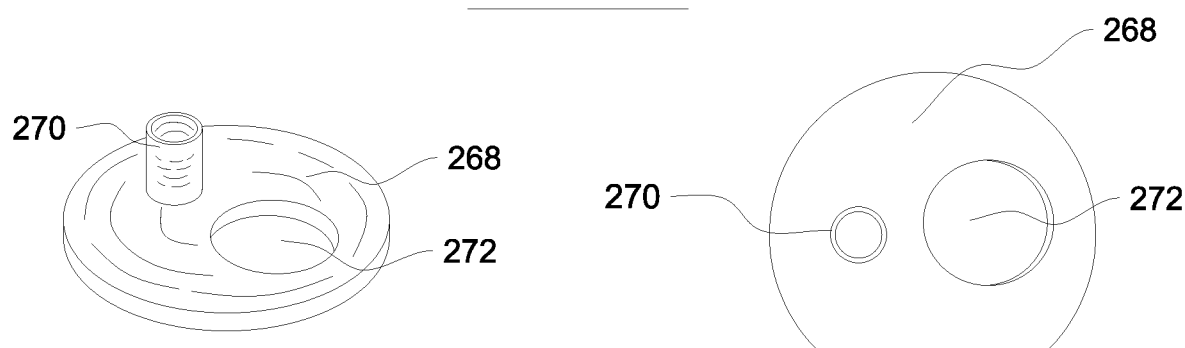
FIG. 30
FIG. 31
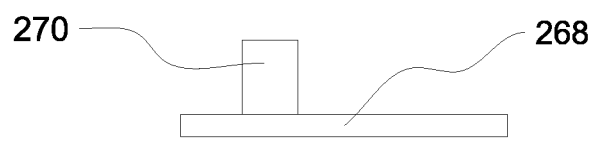
FIG. 32

DEVICE FOR HOLDING A RACKING CANE

CROSS-REFERENCE TO RELATED APPLICATIONS

This patent application claims priority to, and incorporates by reference in its entirety, U.S. Provisional Patent Application No. 62/820,198, entitled "Device For Holding A Racking Cane", filed on Mar. 18, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a device for holding a racking cane. More particularly, the invention relates to an adjustable device for holding a racking cane steady relative to a carboy.

2. Background

During the process of making wine, it is necessary for the home winemaker to rack their wine from one carboy to another several times or more in order to produce a clear and good quality wine. It is very important to rack the wine off this sediment to prevent it from giving off-flavors to the wine. The racking process is repeated as necessary when more sediment has accumulated. With each successive racking, less sediment will accumulate. At some point during the racking process, the carboy must be tilted in order to gather the last portion of wine in one place to transfer it into the receiving carboy. Once the carboy is tilted, it is necessary to place and hold the racking cane by hand where the last portion of wine has gathered to retrieve the wine without disturbing the sediment.

Depending on the racking cane and holder used, it may be necessary to hold the racking cane to start the siphon, and then place it in the holder once some wine has been removed. Once the siphon has started, all of the conventional holders will only hold the racking cane vertically, however not very effectively. Although some conventional holders may hold the racking cane slightly more effectively than others for a portion of the racking process, all of them require the racking cane to be removed from the holder and managed by hand at the most crucial moment, racking the last portion of wine off the sediment. During this critical time, it is difficult to position the racking cane by hand precisely where the last portion of wine is to be collected without disturbing the sediment. The necessity to hold the racking cane at this time is just an invitation to disturb the sediment and thus include some with the last portion of wine transferred into the receiving carboy. Remember, the sediment often is very light and fluffy and is easily disturbed by the slightest movement of the racking cane. The requisite to hold the racking cane at any time during the racking process significantly increases the chance of disturbing the sediment. If sediment is transferred, it will be necessary to wait for it to settle again. More concerning, the quality of the wine may be adversely affected. The winemaker takes great care not to disturb the sediment in order to prevent it from being racked into the receiving carboy only to be racked off of again.

Conventional racking holders have numerous limitations and drawbacks. For example, conventional racking holders do not work effectively with glass and/or plastic carboy necks. Also, conventional racking holders do not allow the racking cane to be placed at an angle relative to the carboy. In addition, conventional racking holders do not hold the racking cane securely and hands-free at all times.

Therefore, what is needed is a device for holding a racking cane that works effectively with both glass and plastic carboy necks. Moreover, a device for holding a racking cane is needed that allows the racking cane to be placed at virtually any angle. Furthermore, there is a need for a device for holding a racking cane that holds the racking cane on the carboy in a secure and hands-free manner at all times.

BRIEF SUMMARY OF EMBODIMENTS OF THE INVENTION

Accordingly, the present invention is directed to a device for holding a racking cane that substantially obviates one or more problems resulting from the limitations and deficiencies of the related art.

In accordance with one or more embodiments of the present invention, there is provided a device for holding a racking cane that includes a base component, the base component configured to be attached to a neck of a carboy; and a clip component coupled to the base component, the clip component configured to hold a racking cane steady relative to the carboy, the clip component being adjustable relative to the base component so as to allow a position and/or angle of the racking cane to be adjusted by a user.

In a further embodiment of the present invention, the base component comprises a cylindrical body portion with an outer peripheral surface and an inner peripheral surface.

In yet a further embodiment, the device further comprises a compressible lining material disposed on the inner peripheral surface of the cylindrical body portion of the base component, the compressible lining material enabling the base component to be adaptable to the necks of carboys having various diameters and shapes.

In still a further embodiment, the device further comprises a tightening knob coupled to the cylindrical body portion of the base component, the tightening knob configured to tighten the cylindrical body portion of the base component against the neck of the carboy so that the device is capable of being securely attached to the carboy.

In yet a further embodiment, the tightening knob is coupled to the cylindrical body portion of the base component by a plurality of outwardly extending tabs, each of the outwardly extending tabs including an aperture for receiving a shaft of the tightening knob.

In still a further embodiment, the base component further comprises a slot extending along the length of the cylindrical body portion, the slot enabling the cylindrical body portion of the base component to flex when the tightening knob is tightened by the user.

In yet a further embodiment, the base component further comprises one or more notches disposed in a top portion of the cylindrical body portion or one or more slots disposed in a sidewall portion of the cylindrical body portion, the one or more notches or the one or more slots enabling the cylindrical body portion of the base component to flex when the tightening knob is tightened by the user.

In still a further embodiment, the base component comprises a body portion and a vertical member extending upwardly from the body portion, the clip component being adjustably attached to the vertical member of the base component.

In yet a further embodiment, the vertical member comprises an elongate slot disposed therethrough, the elongate slot enabling the clip component to be slidably adjustable relative to the base component so as to allow the position of the racking cane to be adjusted by the user.

In still a further embodiment, the clip component is rotatably coupled to the base component so as to allow the angle of the racking cane to be adjusted by the user.

In yet a further embodiment, the clip component comprises a C-shaped clip portion and a stem portion attached to the C-shaped clip portion, the C-shaped clip portion of the clip component configured to hold the racking cane therein, and the stem portion of the clip component adjustably attached to the base component.

In still a further embodiment, the device further comprises a knob component adjustably coupling the stem portion of the clip component to the base component, the knob component configured to fix the position and the angle of the racking cane relative to the carboy after the position and the angle of the racking cane have been selectively adjusted by the user.

In yet a further embodiment, the base component comprises a body portion with a downwardly extending protrusion.

In still a further embodiment, the device further comprises a gripper member adjustably coupled to the body portion of the base component, a position of the gripper member is configured to be adjusted by the user such that the device is capable of being clamped onto a portion of the neck of the carboy.

In yet a further embodiment, the device further comprises a compressible lining material disposed on at least one of: (i) a gripper surface of the gripper member, and (ii) a gripper surface of the downwardly extending protrusion of the body portion of the base component, the compressible lining material enabling the base component to be securely attached to the neck of the carboy and accommodate any threads disposed on the neck of the carboy.

In still a further embodiment, the device further comprises a tightening knob coupled to the body portion of the base component, the tightening knob configured to tighten the gripper member against the neck of the carboy so that the device is capable of being securely attached to the carboy.

In yet a further embodiment, the base component comprises a body portion and a vertical member extending upwardly from the body portion, the clip component being rotatably adjustable relative to the vertical member of the base component so as to allow the angle of the racking cane to be adjusted by the user.

In still a further embodiment, the clip component comprises a C-shaped clip portion and a stem portion attached to the C-shaped clip portion, the C-shaped clip portion of the clip component configured to hold the racking cane therein, and the stem portion of the clip component rotatably coupled to the vertical member of the base component.

In yet a further embodiment, the device further comprises a knob component rotatably coupling the stem portion of the clip component to the base component, the knob component configured to fix the angle of the racking cane relative to the carboy after the angle of the racking cane has been selectively adjusted by the user.

In still a further embodiment, the device further comprises a seal member that includes a nipple protruding upwardly from a top surface of a seal body portion and a racking cane aperture disposed through the seal body portion, the nipple of the seal member configured to receive a portion of a tube for conveying a gas used to pressurize the carboy, and the racking cane aperture configured to accommodate the racking cane being inserted therethrough.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 29 is a perspective view of the device of FIG. 1 illustrated together with a seal member for sealing a neck opening of a carboy, according to an illustrative embodiment of the invention;

FIG. 30 is a perspective view of the seal member illustrated in FIG. 29;

FIG. 31 is a top plan view of the seal member illustrated in FIG. 29; and

FIG. 32 is a side elevational view of the seal member illustrated in FIG. 29.

Throughout the figures, the same parts are always denoted using the same reference characters so that, as a general rule, they will only be described once.

DETAILED DESCRIPTION OF EMBODIMENTS OF THE INVENTION

Figure 12:
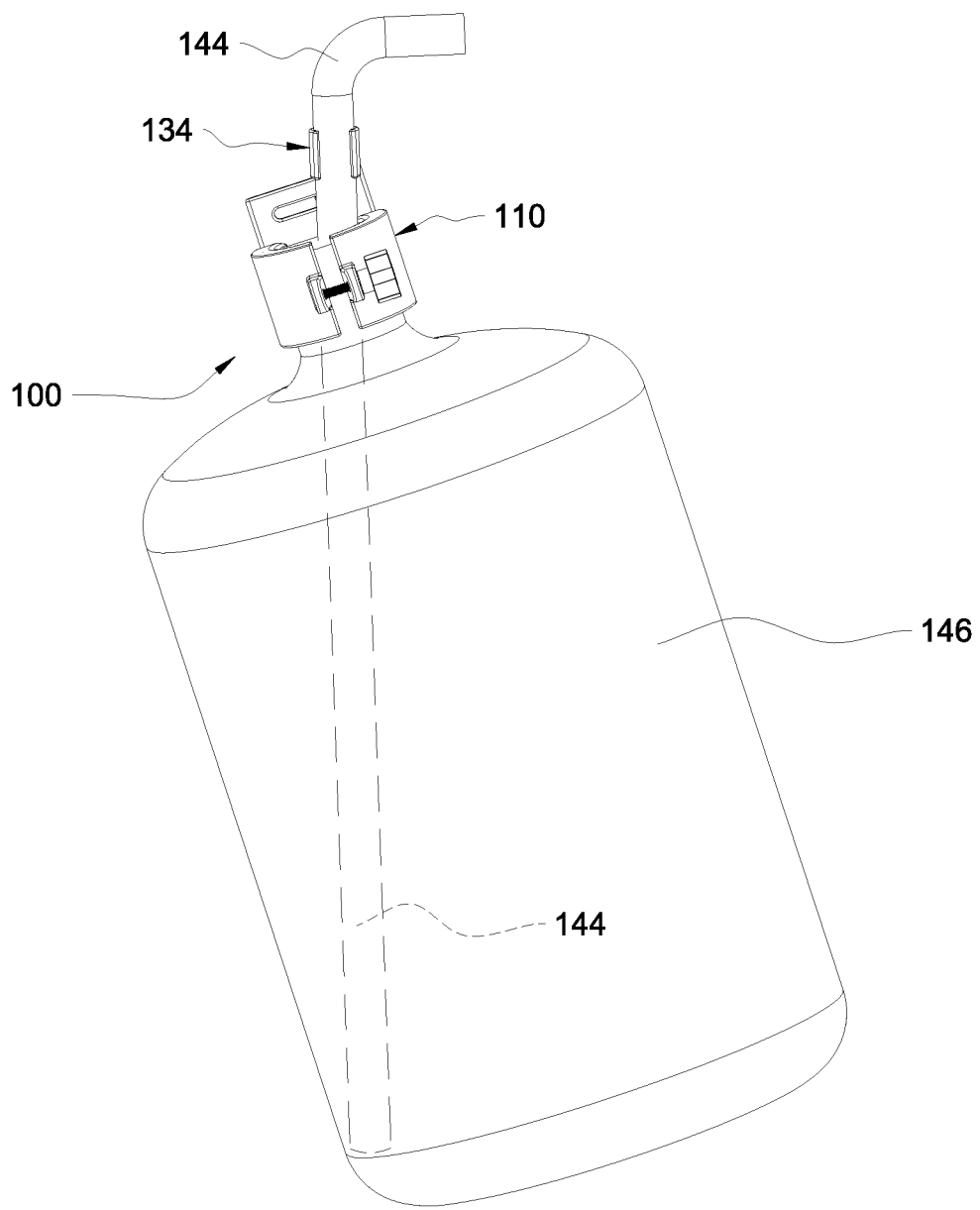
FIG. 12 is a perspective view illustrating the device of FIG. 1 being used to hold a racking cane steady and at an angle relative to a carboy.

A first illustrative embodiment of a device for holding a racking cane is seen generally at 100 in FIGS. 1-7. With initial reference to FIGS. 1 and 3, it can be seen that the device 100 generally comprises a base component 110, the base component 110 configured to be attached to a neck of a carboy 146 (see FIG. 12); and a clip component 134 coupled to the base component 110, the clip component 134 configured to hold a racking cane 144 (see FIG. 12) steady relative to the carboy 146 (see FIG. 12), the clip component 134 being adjustable relative to the base component 110 so as to allow a position and/or angle of the racking cane to be adjusted by a user.

Figure 1:
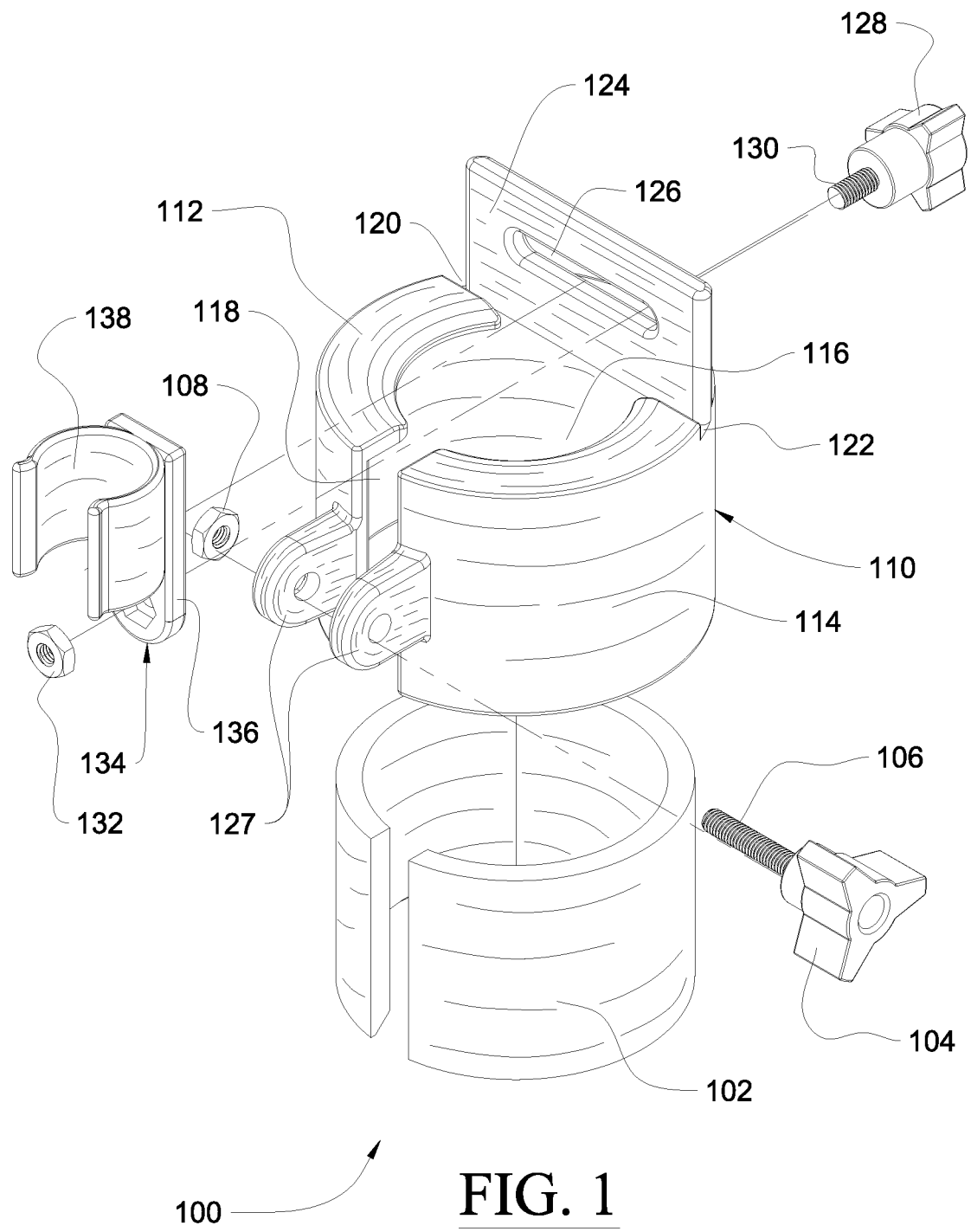
FIG. 1 is an exploded perspective view of a device for holding a racking cane, according to a first illustrative embodiment of the invention.
Figure 2:
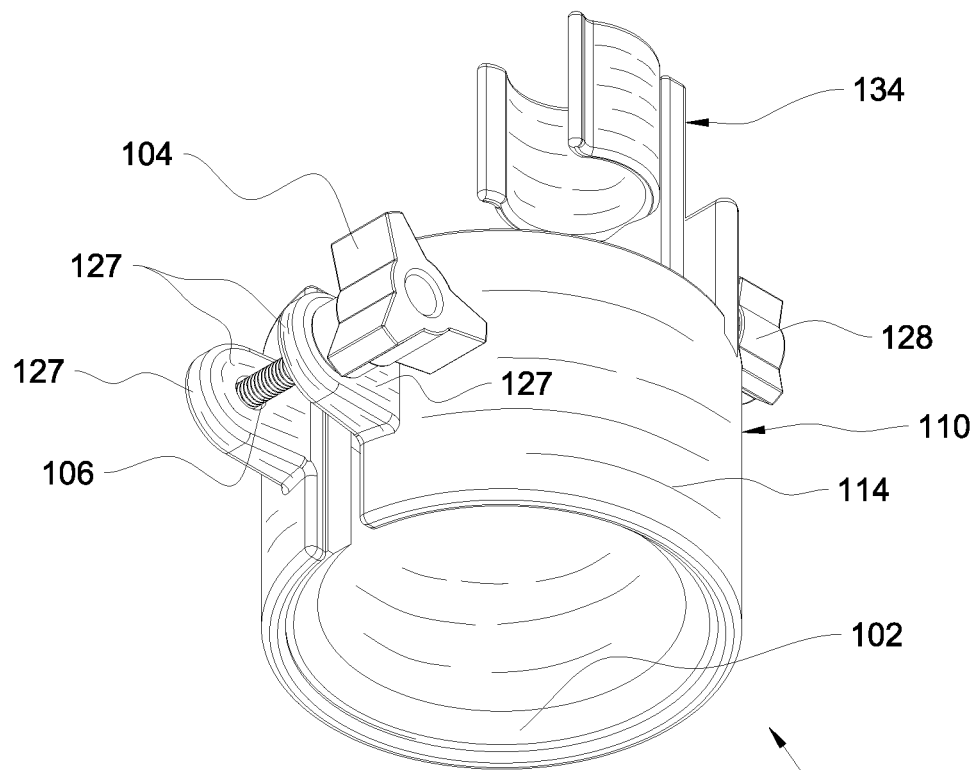
FIG. 2 is a bottom-side assembled perspective view of the device of FIG. 1.
Figure 3:
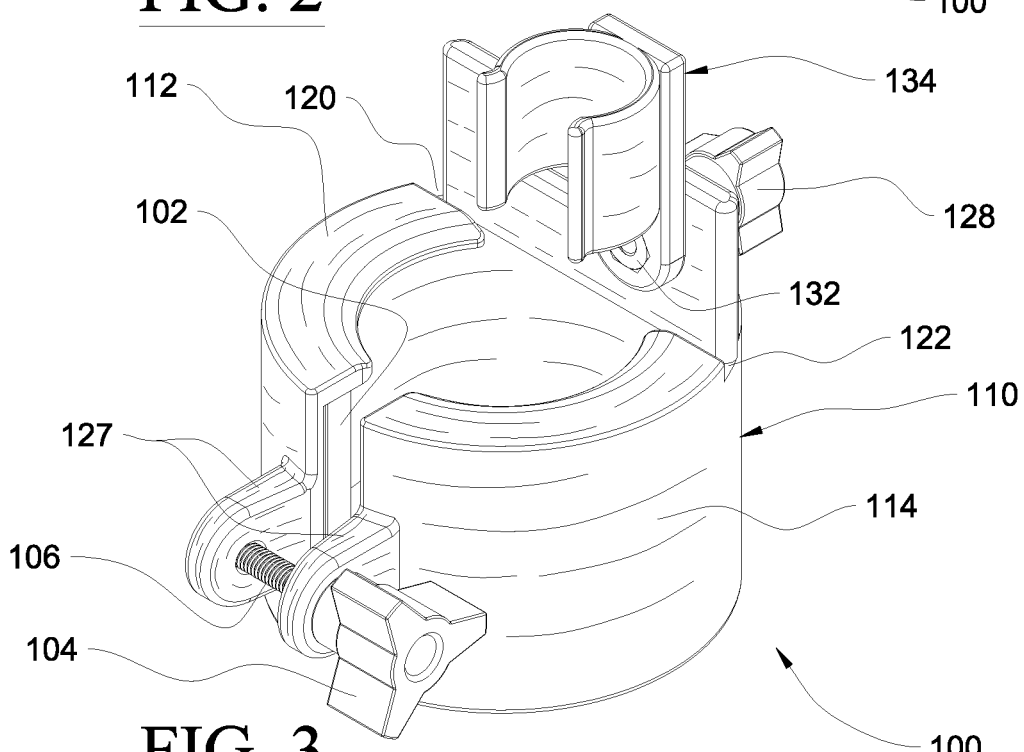
FIG. 3 is a top-side assembled perspective view of the device of FIG. 1.

Referring to FIGS. 1 and 2, it can be seen that, in the illustrative embodiment, the base component 110 of the device 100 comprises a cylindrical body portion with an outer peripheral surface and an inner peripheral surface. As shown in these figures, the cylindrical body portion of the base component 110 is formed by a top wall portion 112 and a circular sidewall portion 114 connected to the outer peripheral edge of the top wall portion 112. The top wall portion 112 of the base component 110 defines a central opening 116 for accommodating the racking cane 144 (see FIG. 12) passing therethrough. In addition, as shown in the illustrative embodiment of FIGS. 1 and 2, the device 100 further comprises a compressible lining material 102 (e.g., a compressible foam material) disposed on the inner peripheral surface of the cylindrical body portion of the base component 110. The compressible lining material 102 enables the base component 110 to be adaptable to the necks of carboys having various diameters and shapes.

Turning again to FIGS. 1-3, it can be seen that, in the illustrative embodiment, the device 100 further comprises a tightening knob 104 with a threaded shaft 106 coupled to the cylindrical body portion of the base component 110. The tightening knob 104 is configured to tighten the cylindrical body portion of the base component 110 against the neck of the carboy 146 (see FIG. 12) so that the device 100 is capable of being securely attached to the carboy 146. As shown in these figures, the tightening knob 104 is coupled to the cylindrical body portion of the base component 110 by a plurality of outwardly extending tabs 127. Each of the outwardly extending tabs 127 includes an aperture for receiving the threaded shaft 106 of the tightening knob 104. A nut 108 is provided on the distal end of the threaded shaft 106 in order to secure the tightening knob 104 to the base component 110.

Now, referring to FIGS. 1 and 5-7 of the illustrative embodiment, it can be seen that the base component 110 further comprises a slot 118 extending along the length of the cylindrical body portion. The slot 118 enables the cylindrical body portion of the base component 110 to flex when the tightening knob 104 is tightened by the user. Also, in the illustrative embodiment, the base component 110 further comprises first and second spaced-apart notches 120, 122 disposed in the top wall portion 112 of the cylindrical body portion. The first and second spaced-apart notches 120, 122 enable the cylindrical body portion of the base component 110 to flex when the tightening knob 104 is tightened by the user.

Figure 4:
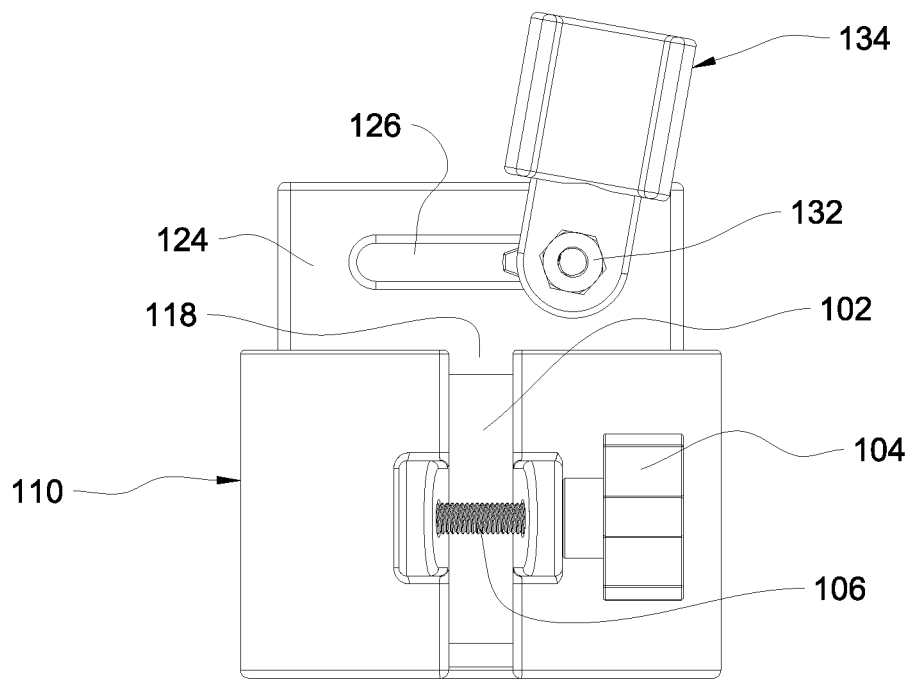
FIG. 4 is a front elevational view of the device of FIG. 1.
Figure 5:
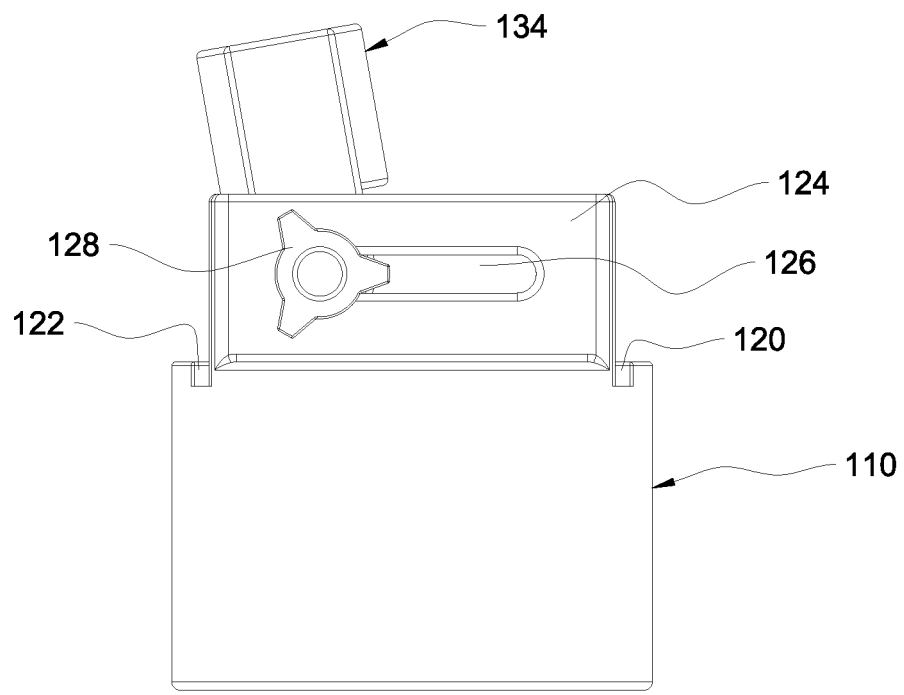
FIG. 5 is a rear elevational view of the device of FIG. 1.
Figure 6:
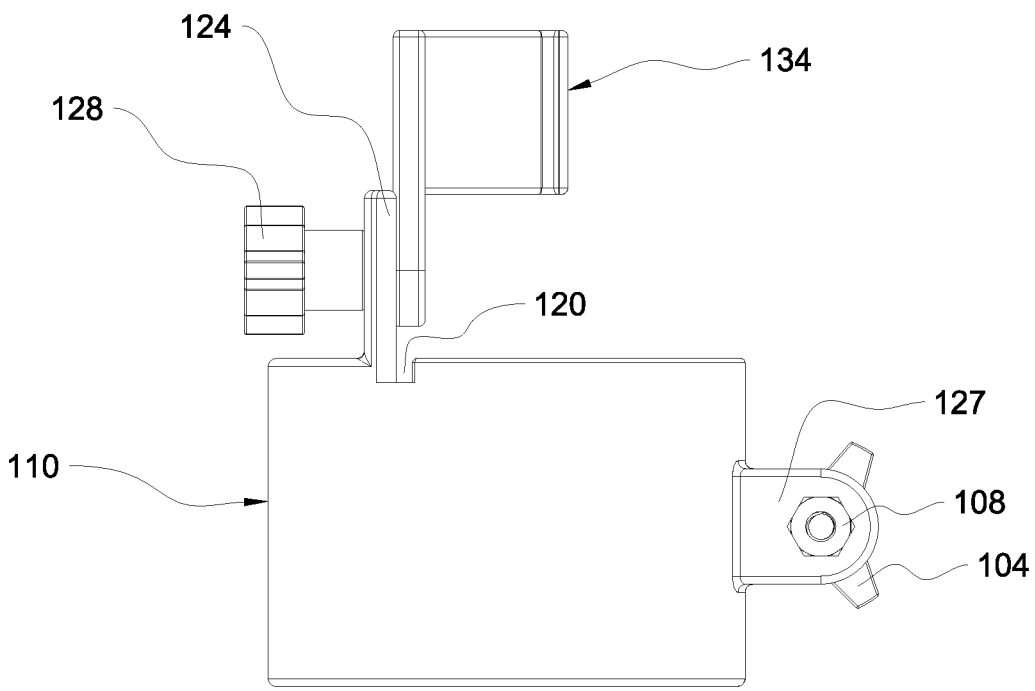
FIG. 6 is a first side elevational view of the device of FIG. 1.
Figure 7:
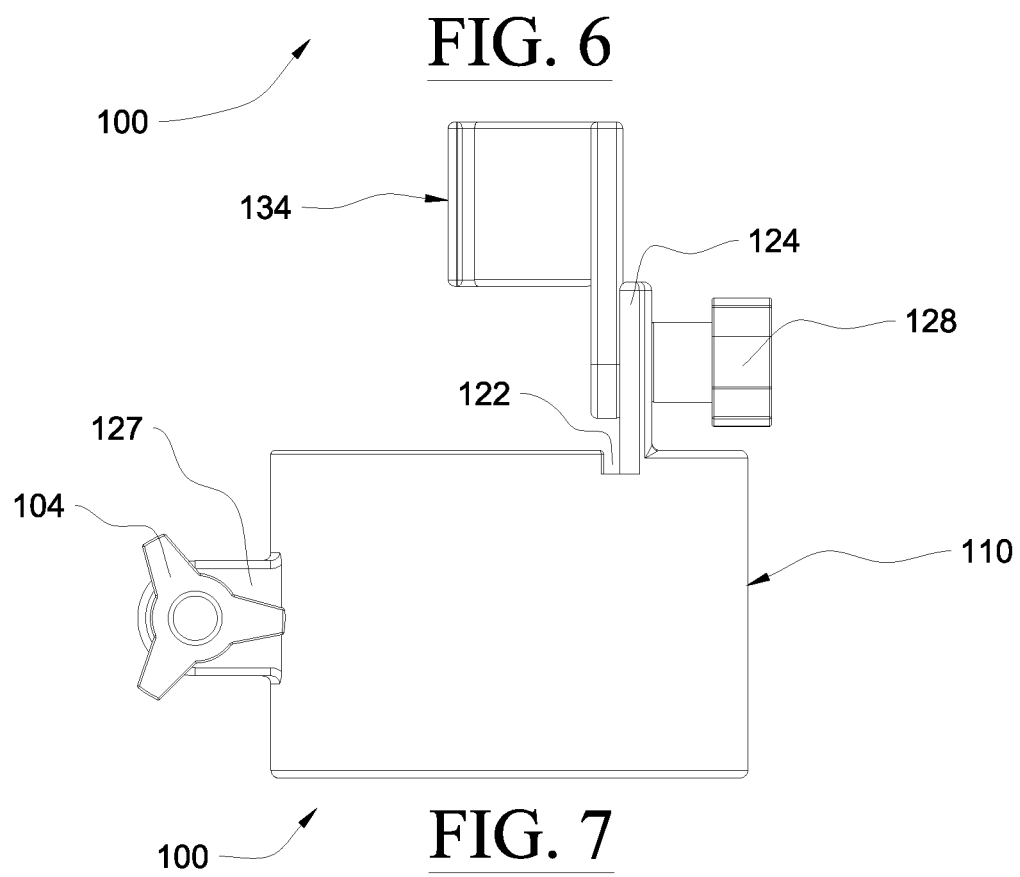
FIG. 7 is a second side elevational view of the device of FIG. 1.

As depicted in FIGS. 1, 4, and 5, in the illustrative embodiment, the base component 110 of the device 100 further comprises a vertical member 124 extending upwardly from the cylindrical body portion. The clip component 134 is adjustably attached to the vertical member 124 of the base component 110. More specifically, as shown in these figures, the vertical member 124 comprises an elongate slot 126 disposed therethrough, and the elongate slot 126 enables the clip component 134 to be slidably adjustable relative to the base component 110 so as to allow the position of the racking cane 144 (see FIG. 12) to be adjusted by the user. Also, in the illustrative embodiment, the clip component 134 is rotatably coupled to the base component 110 so as to further allow the angle of the racking cane 144 to be adjusted by the user.

Next, with particular reference to FIGS. 1 and 8-11, the details of the clip component 134 of the illustrative embodiment will be described. As shown in these figures, the clip component 134 generally comprises a C-shaped clip portion 138 and a vertical stem portion 136 attached to the C-shaped clip portion 138. The C-shaped clip portion 138 of the clip component 134 is configured to hold the racking cane 144 therein (see FIG. 12), and the vertical stem portion 136 of the clip component 134 is adjustably attached to the base component 110 (see FIGS. 2-7).

Figure 8:
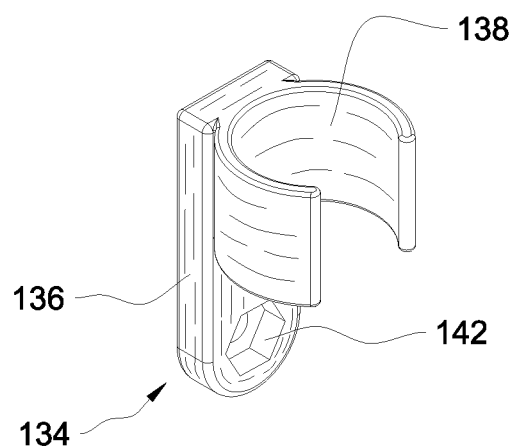
FIG. 8 is a perspective view of the clip component of the device of FIG. 1.
Figure 9:
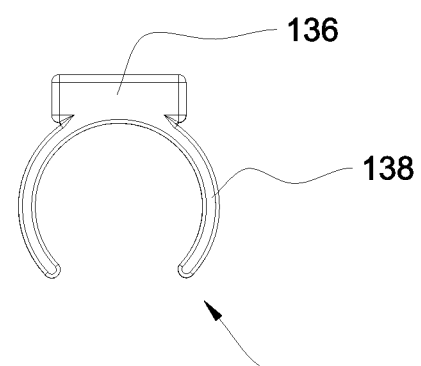
FIG. 9 is a top plan view of the clip component of FIG. 8.
Figure 10:
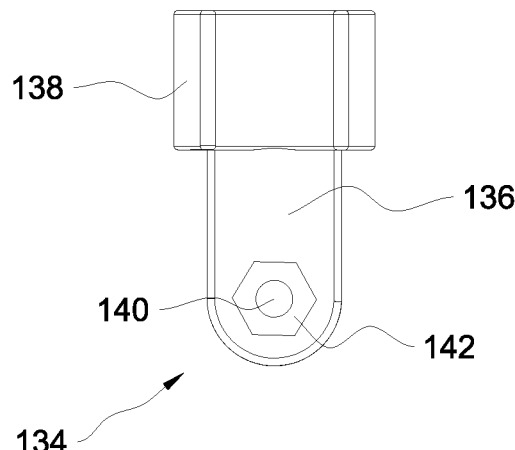
FIG. 10 is a front elevational view of the clip component of FIG. 8.
Figure 11:
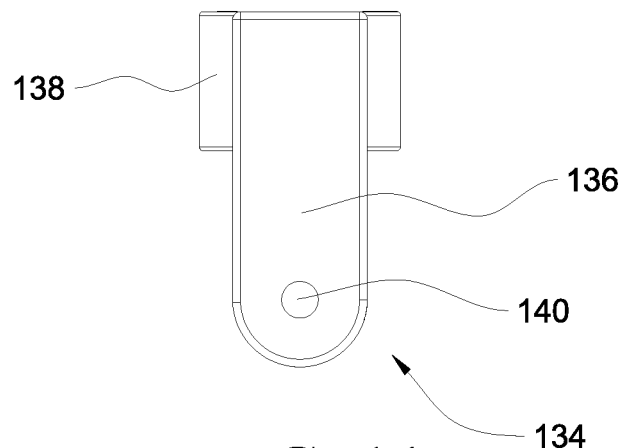
FIG. 11 is a rear elevational view of the clip component of FIG. 8.

Turning again to FIGS. 1-7, it can be seen that, in the illustrative embodiment, the device 100 further comprises a knob component 128 with a threaded shaft 130 adjustably coupling the vertical stem portion 136 of the clip component 134 to the base component 110. The knob component 128 is configured to fix the position and the angle of the racking cane 144 (see FIG. 12) relative to the carboy 146 (see FIG. 12) after the position and the angle of the racking cane 144 (see FIG. 12) have been selectively adjusted by the user. As shown in these figures, the threaded shaft 130 of the knob component 128 adjustably couples the clip component 134 to the vertical member 124 of the base component 110. More specifically, the threaded shaft 130 of the knob component 128 passes through the elongate slot 126 of the vertical member 124 and a fastener aperture 140 near the bottom end of the vertical stem portion 136 of the clip component 134. A nut 132 is provided on the distal end of the threaded shaft 130 in order to secure the clip component 134 to the base component 110. As best shown in FIGS. 8 and 10, in the illustrative embodiment, the vertical stem portion 136 of the clip component 134 comprises a hexagonal recess 142 formed therein for accommodating the recessed mounting of the nut 132.

In the illustrative embodiment, in order to accommodate various carboy neck sizes and shapes, the inside diameter of the cylindrical body portion of the base component 110 may be made approximately one-half (½) inch larger than all typical carboy necks (e.g., the inside diameter of the cylindrical body portion of the base component 110 may be approximately 2.7 inches). The height of the cylindrical body portion of the base component 110 may be approximately two (2) inches in the illustrative embodiment. The compressible lining material 102 of the illustrative embodiment, which may be in the form of a foam lining having a thickness of approximately one-quarter (¼) of an inch, is placed on the inner peripheral surface of the cylindrical body portion of the base component 110 so as to allow the base component 110 to fit snugly over the carboy neck by conforming to its unique size and shape. In the illustrative embodiment, the top wall portion 112 of the base component 110 assists in keeping the device 100 steady by resting on the top of the carboy neck wall, and the central opening 116 is amply sized to allow the racking cane access into the carboy.

Also, in the illustrative embodiment, the combination of the slot 118 and the notches 120, 122 provides the capability for the device 100 to be adjusted securely around the carboy neck using tightening knob 104. The slot 118 in the circular sidewall portion 114 of the base component 110 makes room for the diameter of the base component 110 to be reduced. The two small notches 120, 122 through the top of the base component 110 provide the capability for the walls 112, 114 of the base component 110 to flex and be closed around the carboy neck. The combination of the slot 118 and the notches 120, 122 provide the means for the compressible lining material 102 to be compressed, and then conform to the unique size and shape of the carboy holding the device 100 securely in place.

In the illustrative embodiment, the vertical member 124 with horizontal elongate slot 126 provides the means to attach the clip component 134 at any horizontal position or desired angle using knob component 128. The optimal horizontal position and angle for the clip component 134 will differ for each carboy neck. For example, the horizontal placement of the clip component 134 on plastic carboys will vary considerably from that of a glass carboy when used vertically and even more when placing the clip component 134 at an angle. The racking clip 134 placement varies because glass carboy neck walls are much thicker and the interior diameters are much smaller than the necks of plastic carboys necks.

To use the device 100 of the first illustrative embodiment, the base component 110 of the device 100 is slipped over the carboy neck by sliding the base component 110 down until it comes to rest on top of the carboy neck. Then, the tightening knob 104 is used to secure the base component 110 onto the neck of the carboy. After the tightening of the knob 104, the clip component 134 is adjusted horizontally in slot 126, and the angle of the clip component 134 is adjusted so as to position the lower end of the racking cane in the location of the carboy where the last portion of wine will be collected. Next, the knob 128 is tightened to secure the clip component 134 in place. Adjusting the angle at this point will prevent the need to adjust it later, which may disturb the sediment in the carboy.

Once the device 100 is secured, the racking cane may now be inserted into the clip component 134 and lowered into the wine. With the racking cane held steady and hands-free starting the siphon will be considerably easier. When approaching the time to rack the last portion of wine off the sediment, if necessary, the depth and angle of the racking cane may be gently adjusted.

Figure 27:
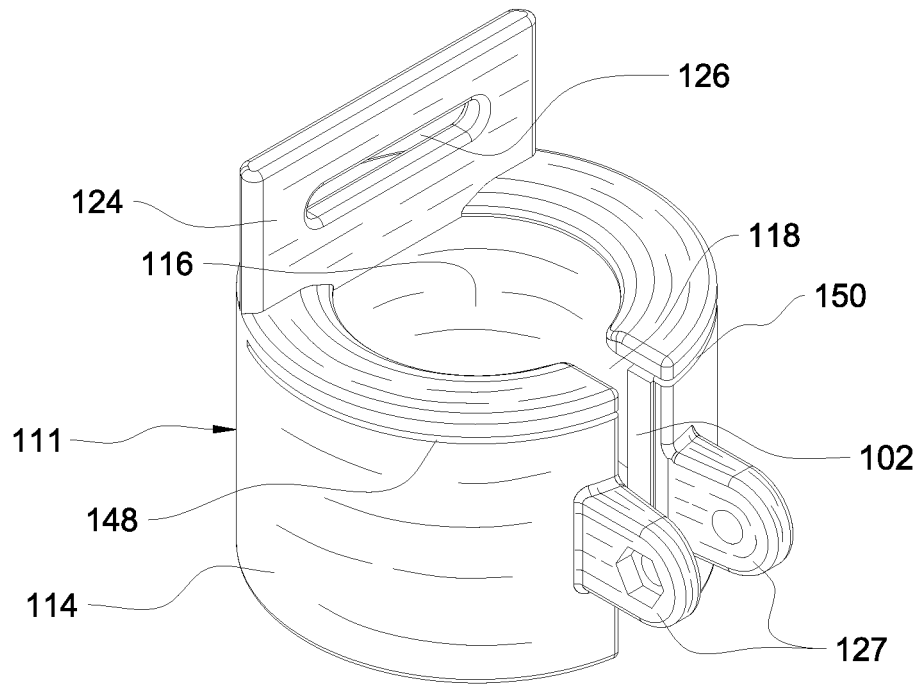
FIG. 27 is a perspective view of a base component of a device for holding a racking cane, according to an alternative embodiment of the invention.
Figure 28:
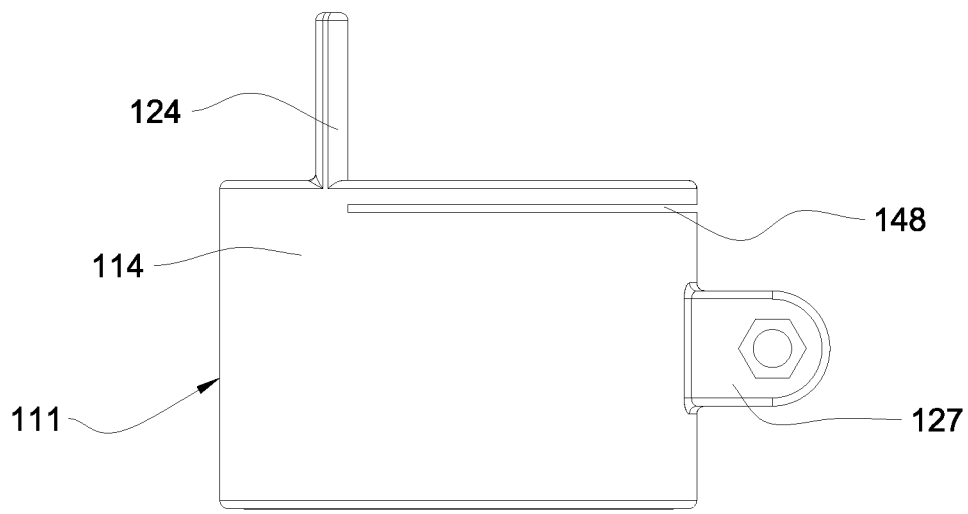
FIG. 28 is a side elevational view of the base component of FIG. 27.

An alternative embodiment of the base component 111 of the device for holding a racking cane 100 is shown in FIGS. 27 and 28. The base component 111 of FIGS. 27 and 28 is similar in most respects to the base component 110 described above. However, unlike the base component 110 described above, the base component 111 is provided with first and second elongate slots 148, 150 in the circular sidewall portion 114, rather than being provided with the first and second spaced-apart notches 120, 122 disposed in the top wall portion 112. Similar to the first and second spaced-apart notches 120, 122, the first and second elongate slots 148, 150 in the circular sidewall portion 114 enable the cylindrical body portion of the base component 110 to flex when the tightening knob 104 is tightened by the user. More specifically, the first and second elongate slots 148, 150 in the circular sidewall portion 114 provide the capability for the circular sidewall portion 114 of the base component 110 to flex and be closed around the carboy neck while the top wall portion 112 remains generally stationary. In other words, the first and second elongate slots 148, 150 separate the circular sidewall portion 114 of the base component 110 from the top wall portion 112 so that the circular sidewall portion 114 is able to be displaced relative to the top wall portion 112 as the tightening knob 104 is tightened by the user. In the alternative embodiment of FIGS. 27 and 28, the combination of the vertical body portion slot 118 and the first and second elongate slots 148, 150 provide the means for the compressible lining material 102 to be compressed, and then conform to the unique size and shape of the carboy holding the device 100 securely in place.

In one or more embodiments, several components of the device 100 may be formed from plastic by injection molding (e.g., the base component 110, 111 and the clip component 134). However, in alternative embodiments, vacuum forming may also be used to form one or more components of the device 100. Further, in other alternative embodiments, one or more components of the device 100 may be formed from metal by a stamping technique or other suitable metal forming technique. Racking canes are commonly found in two standard sizes, i.e., three-eighths (⅜) of an inch and one-half (½) inch. Auto-siphon type racking canes also are available in racking cane sizes of three-eighths (⅜) of an inch and one-half (½) inch; however, the outside diameters of these racking canes are three-quarters (¾) of an inch and one (1) inch, respectively. In the illustrative embodiment, clip components 134 having two different sizes may be used to accommodate these common racking cane sizes, namely one clip for the two smaller racking cane sizes, and another clip for the two larger racking cane sizes.

Now, with reference to FIGS. 29-32, a seal member 268 that may be used with the device for holding a racking cane 100 will be described. During the process of making wine or beer, the maker may want to protect it from exposure to air. Beer is especially sensitive to the exposure to air, and air may adversely affect its quality. A very low pressure of gas, such as $CO_2$, is often used to apply pressure in the carboy that contains the beer to be racked. This pressure will force/move the beer into the receiving carboy eliminating considerable exposure to air. This process is possible using the racking buddy in combination with the seal member 268 depicted in FIGS. 29-32, which may be in the form of a rubber gasket attachment in the illustrative embodiment. The seal member 268 provides the means to seal the top of the carboy, therefore providing the ability to connect a hose to apply pressure and also provides an opening for an air tight seal around the racking cane 144 where it enters into the carboy.

As shown in FIGS. 29-32, in the illustrative embodiment, the seal member 268 comprises a disc-shaped body portion with a nipple 270 protruding upwardly from the top surface of the disc-shaped body portion and a racking cane aperture 272 disposed through the disc-shaped body portion. The sealing member 268 is used to seal a neck opening of a carboy so that the beer, wine, or other liquid in the carboy is able to be effectively removed from the carboy by pressure. The hose for pressurizing the carboy is inserted onto the nipple 270 of the seal member 268, while the racking cane 144 is inserted through the racking cane aperture 272 of the seal member 268 (see FIG. 29). In the illustrative embodiment, the seal member 268 may be formed from a suitable flexible polymeric material or rubber.

A second illustrative embodiment of a device for holding a racking cane is seen generally at 200 in FIGS. 13-19. Referring to these figures, it can be seen that, in many respects, the second illustrative embodiment is similar to that of the first illustrative embodiment. Moreover, many elements are common to both such embodiments. For the sake of brevity, the elements that the second embodiment of the device 200 has in common with the first embodiment will not be discussed in detail because these components have already been described above.

Similar to the device 100 described above, with reference initially to FIGS. 13 and 15, it can be seen that the second embodiment of the device for holding a racking cane 200 generally comprises a base component 230, the base component 230 configured to be attached to a neck 266 of a carboy 264 (see FIG. 26); and a clip component 250 coupled to the base component 230, the clip component 250 configured to hold a racking cane 262 steady relative to the carboy 264 (see FIG. 26), the clip component 250 being adjustable relative to the base component 230 so as to allow a position and/or angle of the racking cane 262 to be adjusted by a user.

Figure 13:
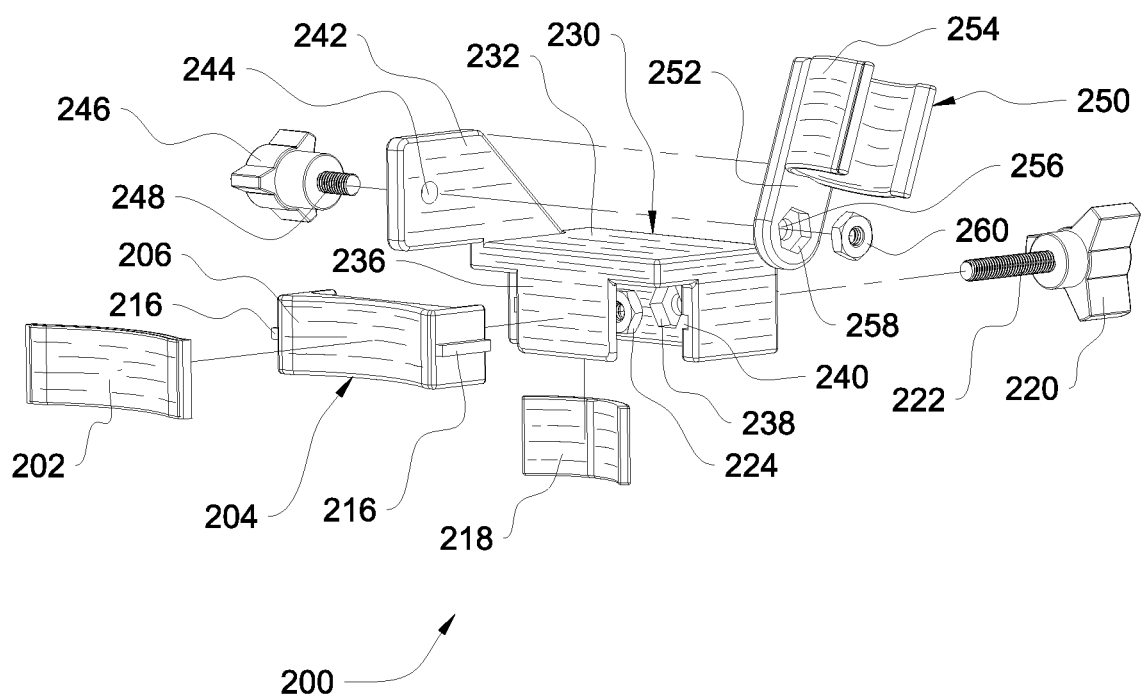
FIG. 13 is an exploded perspective view of a device for holding a racking cane, according to a second illustrative embodiment of the invention.
Figure 14:
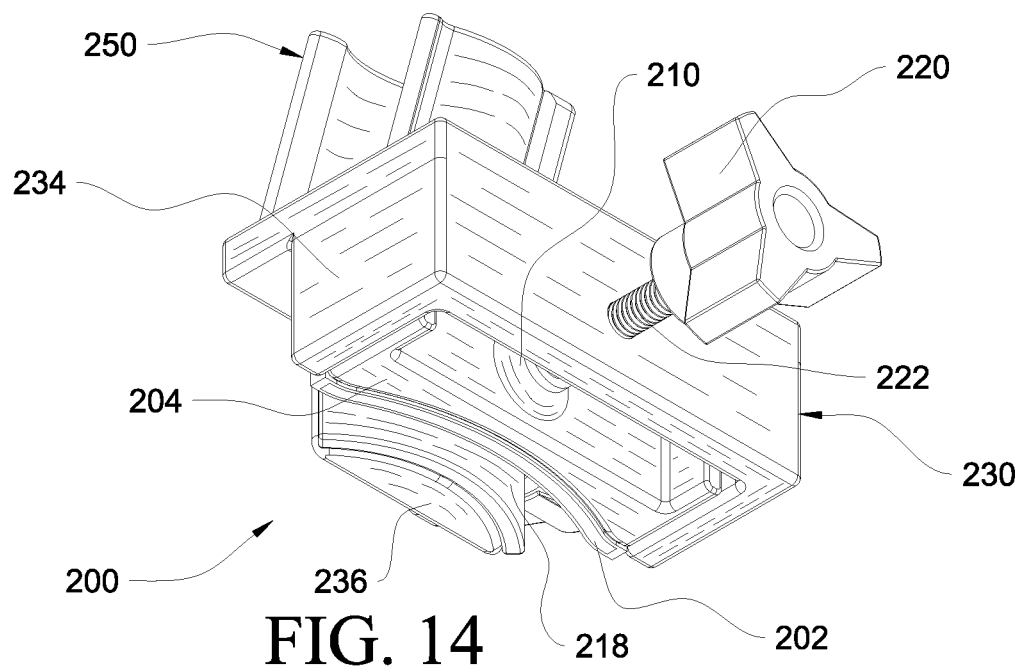
FIG. 14 is a bottom-side assembled perspective view of the device of FIG. 13.
Figure 15:
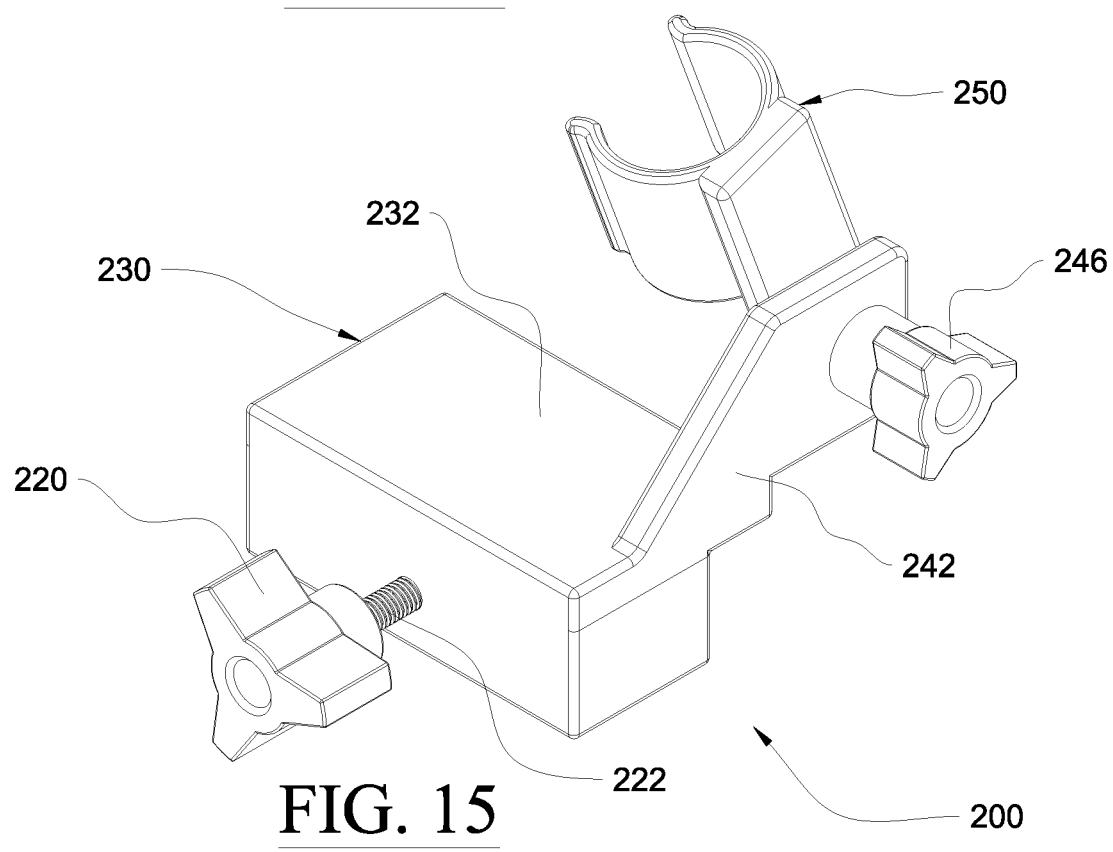
FIG. 15 is a top-side assembled perspective view of the device of FIG. 13.
Figure 16:
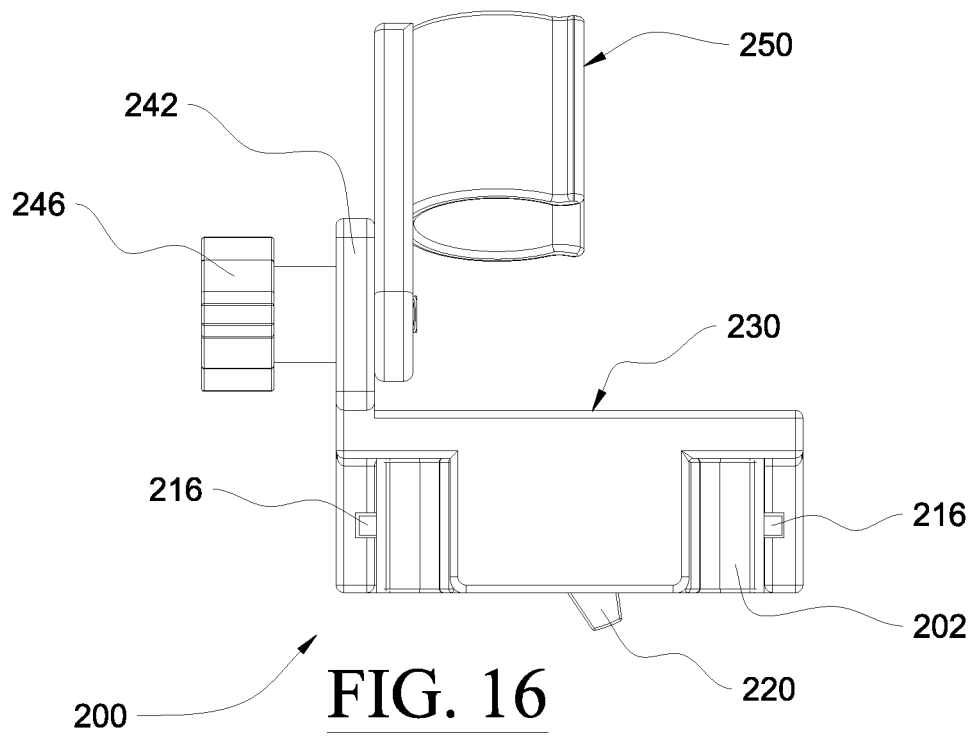
FIG. 16 is a front elevational view of the device of FIG. 13.
Figure 17:
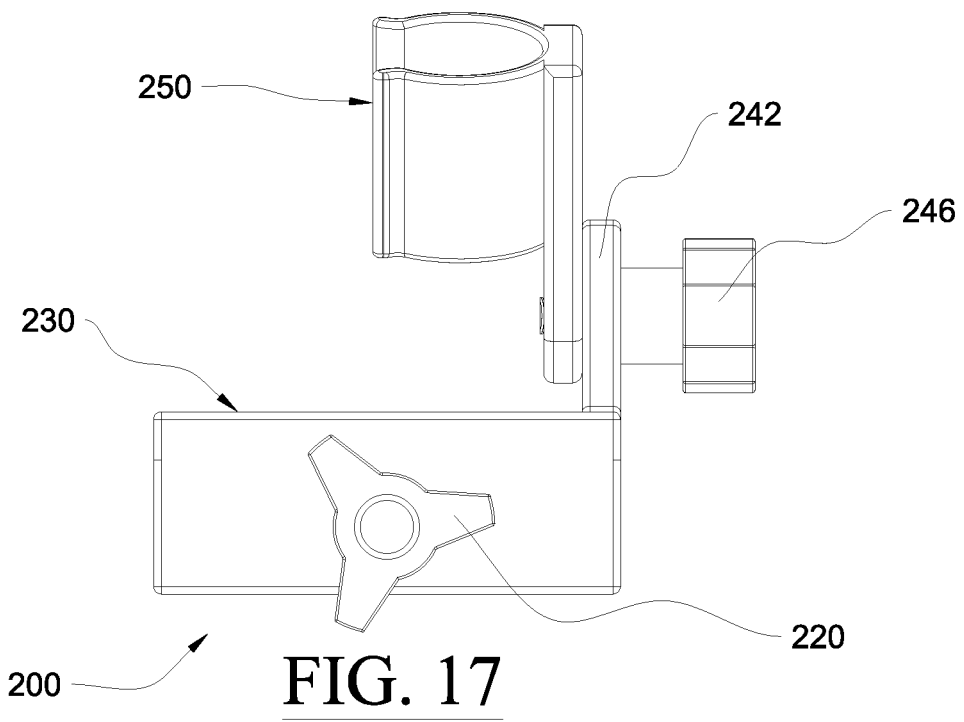
FIG. 17 is a rear elevational view of the device of FIG. 13.

Referring to FIGS. 13-15, it can be seen that, in the illustrative embodiment, the base component 230 of the device 200 comprises a body portion with a downwardly extending protrusion 236. As shown in these figures, the body portion of the base component 230 is formed by a top wall portion 232 and a C-shaped peripheral wall portion 234 connected to the outer peripheral edge of the top wall portion 232. In addition, as shown in the illustrative embodiment of FIGS. 13-15, the device 200 further comprises a gripper member 204 adjustably coupled to the body portion of the base component 230. A position of the gripper member 204 is configured to be adjusted by the user such that the device 200 is capable of being clamped onto a portion of the neck 266 of the carboy 264 (see FIG. 26).

Figure 21:
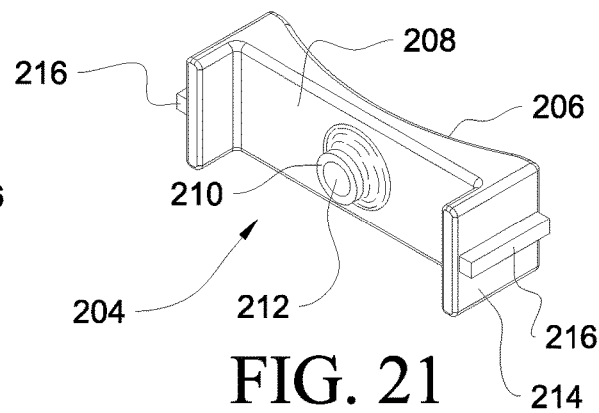
FIG. 21 is a rear perspective view of the gripper member of FIG. 20.
Figure 22:
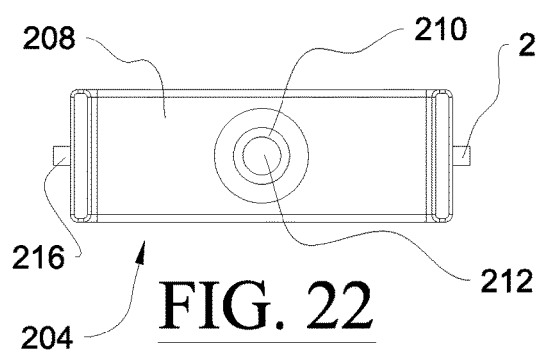
FIG. 22 is a rear elevational view of the gripper member of FIG. 20.
Figure 23:
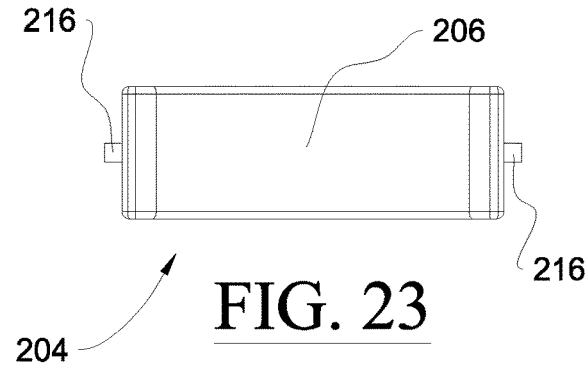
FIG. 23 is a front elevational view of the gripper member of FIG. 20.
Figure 24:
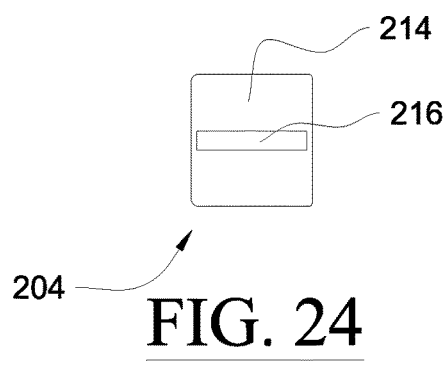
FIG. 24 is a side elevational view of the gripper member of FIG. 20.
Figure 25:
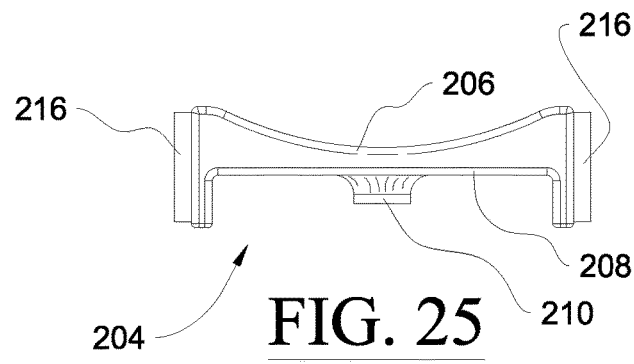
FIG. 25 is a top plan view of the gripper member of FIG. 20.

Now, with particular reference to FIGS. 20-25, the details of the gripper member 204 of the illustrative embodiment will be described. As shown in these figures, the gripper member 204 generally comprises a body portion with a front curved surface 206, a rear flat surface 208, and oppositely disposed side surfaces 214. In FIGS. 21 and 25, it can be seen that a boss 210 extends outwardly from the rear flat surface 208. The boss 210 comprises a bored hole 212 for receiving the threaded shaft 222 of the tightening knob 220, which will be described hereinafter. Each of the oppositely disposed side surfaces 214 of the gripper body portion comprises an elongate protrusion 216 extending from the front to the back thereof (see FIGS. 20-25). The elongate protrusions 216 are each received in corresponding notches 240 of the base component 230 (see FIG. 13) so as to allow the gripper member 204 to be slidably displaced relative to the base component 230 when the tightening knob 220 is turned by the user of the device 200.

As best shown in FIGS. 13 and 14 of the illustrative embodiment, a compressible lining material 202 (e.g., a compressible foam material) is disposed on the front curved surface 206 of the gripper member 204, and a compressible lining material 218 (e.g., a compressible foam material) is disposed on the inner curved surface of the downwardly extending protrusion 236 of the base component 230. The compressible lining materials 202, 218 enable the base component 230 of the device 200 to be securely attached to the neck 266 of the carboy 264 and accommodate any threads disposed on the neck 266 of the carboy 264 (see FIG. 26). That is, in the illustrative embodiment, a portion of the neck 266 of the carboy 264 (see FIG. 26) is capable of being clamped between the compressible lining material 202 on the gripper member 204 and the compressible lining material 218 on the downwardly extending protrusion 236 of the base component 230.

Turning again to FIGS. 13-15, it can be seen that, in the illustrative embodiment, the device 200 further comprises a tightening knob 220 with a threaded shaft 222 coupled to the base component 230 and the gripper member 204. The tightening knob 220 is configured to tighten the gripper member 204 against the neck 266 of the carboy 264 (see FIG. 26) so that the device 200 is capable of being securely attached to the carboy 264. As shown in these figures, the threaded shaft 222 of the tightening knob 220 extends through a fastener aperture in the rear wall of the body portion of the base component 230, and extends into the bored hole 212 of gripper member 204. A nut 224 is provided on the threaded shaft 222 at the inner surface of the rear wall of the body portion of the base component 230 in order to secure the tightening knob 220 to the base component 230. As best shown in the perspective view of FIG. 13, in the illustrative embodiment, the inner surface of the rear wall of the body portion of the base component 230 comprises a hexagonal recess 238 formed therein for accommodating the recessed mounting of the nut 224.

Figure 18:
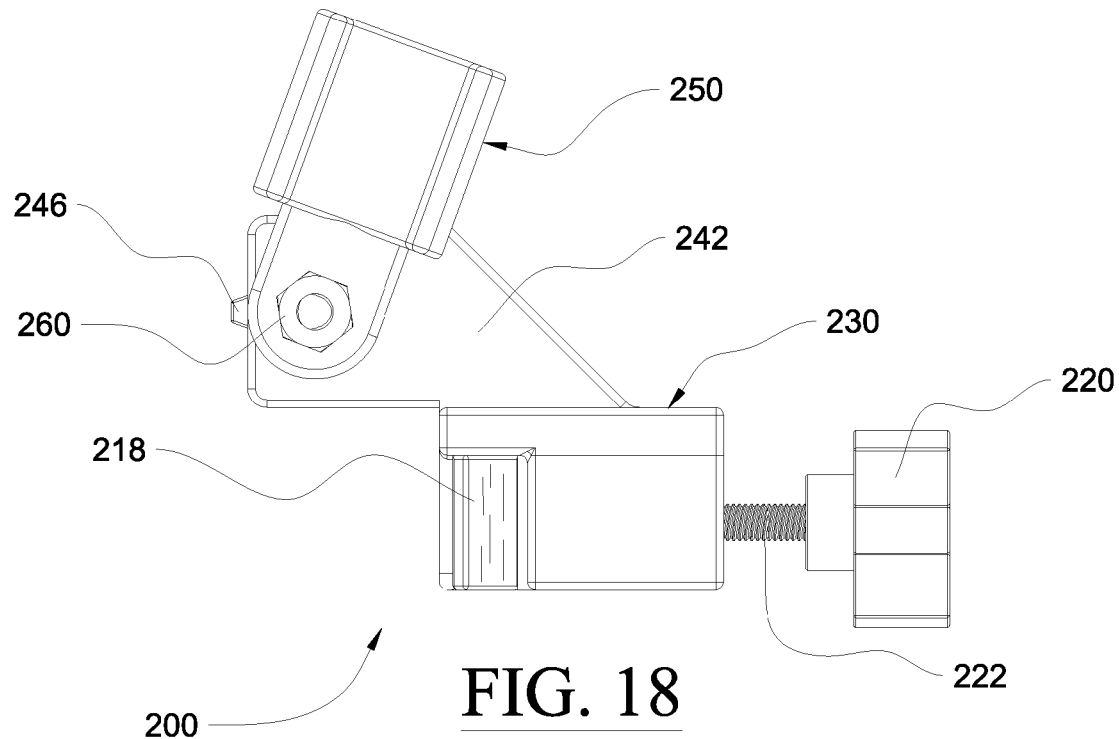
FIG. 18 is a first side elevational view of the device of FIG. 13.
Figure 19:
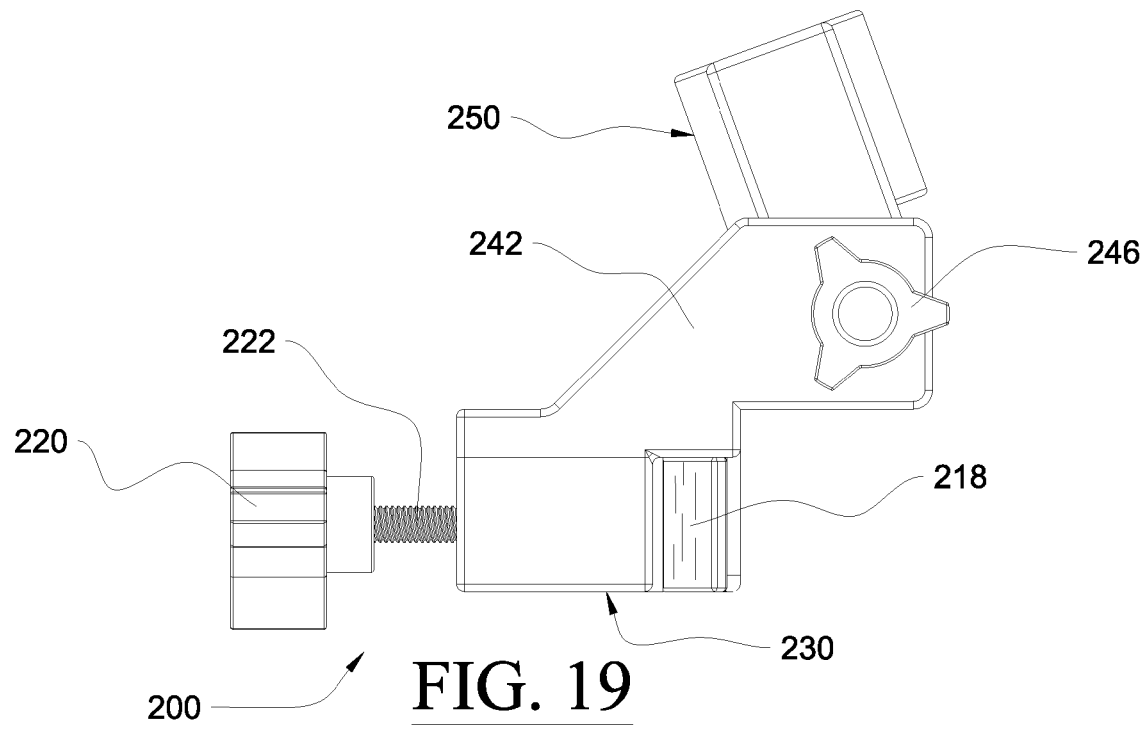
FIG. 19 is a second side elevational view of the device of FIG. 13.
Figure 20:
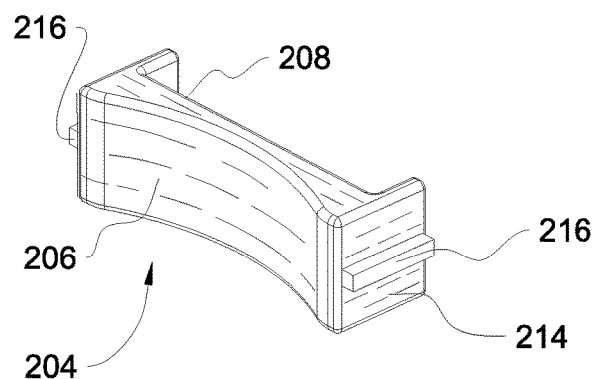
FIG. 20 is a frontal perspective view of the gripper member of the device of FIG. 13.

Now, referring to FIGS. 13, 15, and 18, in the illustrative embodiment, the base component 230 of the device 200 further comprises a vertical member 242 extending upwardly from the body portion. The clip component 250 is rotatably adjustable relative to the vertical member 242 of the base component 230 so as to allow the angle of the racking cane to be adjusted by the user. More specifically, as shown in these figures, the vertical member 242 comprises a fastener aperture 244 disposed therethrough for receiving the threaded shaft 248 of the knob component 246, which will be described hereinafter.

Next, with particular reference to the exploded view of FIG. 13, the details of the clip component 250 of the illustrative embodiment will be described. As shown in these figures, similar to the device 100 described above, the clip component 250 generally comprises a C-shaped clip portion 254 and a vertical stem portion 252 attached to the C-shaped clip portion 254. The C-shaped clip portion 254 of the clip component 250 is configured to hold the racking cane 262 therein (see FIG. 26), and the vertical stem portion 252 of the clip component 250 is rotatably coupled to the vertical member 242 of the base component 230 (see FIGS. 14-19).

Turning again to FIGS. 13 and 16-19, it can be seen that, in the illustrative embodiment, the device 200 further comprises a knob component 246 with a threaded shaft 248 rotatably coupling the vertical stem portion 252 of the clip component 250 to the base component 230. The knob component 246 is configured to fix the angle of the racking cane 262 relative to the carboy 264 (see FIG. 26) after the angle of the racking cane 262 has been selectively adjusted by the user. As shown in these figures, the threaded shaft 248 of the knob component 246 rotatably couples the clip component 250 to the vertical member 242 of the base component 230. More specifically, the threaded shaft 248 of the knob component 246 passes through the fastener aperture 244 of the vertical member 242 and a fastener aperture 256 near the bottom end of the vertical stem portion 252 of the clip component 250. A nut 260 is provided on the distal end of the threaded shaft 248 in order to secure the clip component 250 to the base component 230. As best shown in the exploded view of FIG. 13, in the illustrative embodiment, the vertical stem portion 252 of the clip component 250 comprises a hexagonal recess 258 formed therein for accommodating the recessed mounting of the nut 260.

In the illustrative embodiment, the device 200 is particularly well-suited for accommodating plastic carboys with large neck openings (e.g., carboys with neck openings of approximately 5.5 inches in size). These carboys allow for easy access to the inside of the carboy and are very convenient when it comes to cleaning.

Figure 26:
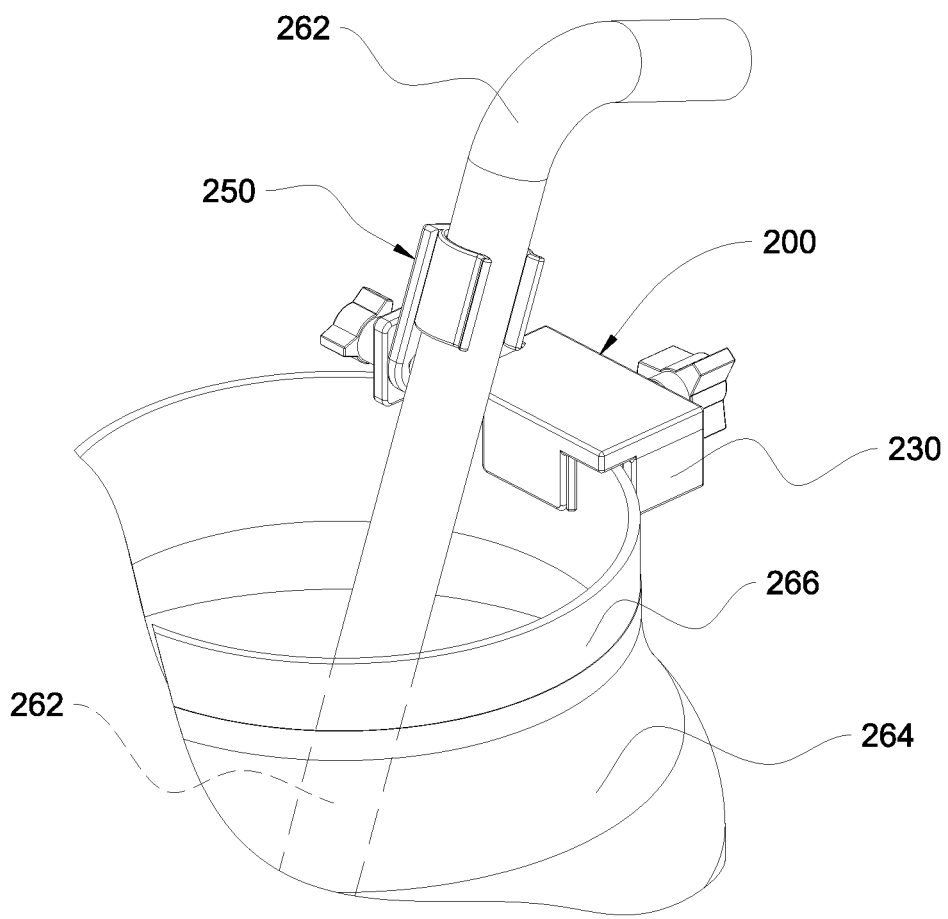
FIG. 26 is a perspective view illustrating the device of FIG. 13 being used to hold a racking cane steady and at an angle relative to a wide mouth carboy.

The capability for the wide mouth version of the device 200 to accommodate these carboys with large neck openings is achieved by clamping the device 200 to the neck 266 of the wide mouth (e.g., as shown in FIG. 26). As described above, the gripper member 204 and the downwardly extending protrusion 236 of the base component 230 have compressible lining materials 202, 218 (e.g., a soft rubber or foam lining) disposed thereon that are tightened/compressed onto a portion of the neck 266 of the carboy 264 (see FIG. 26). The aforementioned compressible lining materials 202, 218 not only provide a secure fit, but also accommodate any threads that may be used for a lid of the carboy. Knob 220 is used to displace the gripper member 204 with compressible lining 202 against the outside surface of the carboy neck, thereby compressing compressible lining 202 and holding the device 200 securely in place on the carboy.

To use the device 200 of the second illustrative embodiment, the device 200 is slipped over the carboy neck, it is then slid down to rest on top of the carboy neck, and knob 220 is used to secure the base component 230 of the device 200 onto the neck of the carboy. After securing the base component 230, the angle of the clip component 250 is adjusted so as to position the lower end of the racking cane to the location where the last portion of wine will be collected in the carboy. Then, the knob 246 is tightened so as to secure the clip 250 in place. Adjusting the angle of the clip 250 at this point will prevent the need to adjust the clip 250 later, which may disturb the sediment.

In one or more embodiments, several components of the device 200 may be formed from plastic by injection molding (e.g., the base component 230 and the clip component 250). However, in alternative embodiments, one or more components of the device 200 may be formed from metal by a stamping technique or other suitable metal forming technique. In the illustrative embodiment, the racking cane clip 134 described above for the device 100 is the same as the racking cane clip 250 of the device 200 so that the racking cane clips 134, 250 can be interchangeably used for either of the two embodiments.

It is readily apparent that the aforedescribed devices for holding a racking cane 100, 200 offer numerous advantages. First, the devices 100, 200 work effectively with both glass and plastic carboys necks. Secondly, the devices 100, 200 allow the racking cane to be placed at virtually any angle. Finally, the devices 100, 200 hold the racking cane on the carboy in a secure and hands-free manner at all times.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A device for holding a racking cane, the device comprising:
    a base component, the base component configured to be attached to a neck of a carboy; and
    a clip component coupled to the base component, the clip component configured to hold a racking cane steady relative to the carboy, the clip component being adjustable relative to the base component so as to allow a position and an angle of the racking cane to be adjusted by a user;
    wherein the base component comprises a body portion and a vertical member extending upwardly from the body portion, the clip component being adjustably attached to the vertical member of the base component; and
    wherein the vertical member comprises an elongate slot disposed therethrough, the elongate slot enabling the clip component to be slidably adjustable relative to the base component so as to allow the position of the racking cane to be adjusted by the user.

2. The device according to claim 1, wherein the body portion of the base component comprises a cylindrical body portion with an outer peripheral surface and an inner peripheral surface.

3. The device according to claim 2, further comprising a compressible lining material disposed on the inner peripheral surface of the cylindrical body portion of the base component, the compressible lining material enabling the base component to be adaptable to the necks of carboys having various diameters.

4. The device according to claim 2, further comprising a tightening knob coupled to the cylindrical body portion of the base component, the tightening knob configured to tighten the cylindrical body portion of the base component against the neck of the carboy so that the device is capable of being securely attached to the carboy.

5. The device according to claim 4, wherein the tightening knob is coupled to the cylindrical body portion of the base component by a plurality of outwardly extending tabs, each of the outwardly extending tabs including an aperture for receiving a shaft of the tightening knob.

6. The device according to claim 4, wherein the base component further comprises a slot extending along the length of the cylindrical body portion, the slot enabling the cylindrical body portion of the base component to flex when the tightening knob is tightened by the user.

7. The device according to claim 4, wherein the base component further comprises one or more notches disposed in a top portion of the cylindrical body portion or one or more slots disposed in a sidewall portion of the cylindrical body portion, the one or more notches or the one or more slots enabling the cylindrical body portion of the base component to flex when the tightening knob is tightened by the user.

8. The device according to claim 1, wherein the clip component comprises a C-shaped clip portion and a stem portion attached to the C-shaped clip portion, the C-shaped clip portion of the clip component configured to hold the racking cane therein, and the stem portion of the clip component adjustably attached to the base component.

9. The device according to claim 8, further comprising a knob component adjustably coupling the stem portion of the clip component to the base component, the knob component configured to fix the position and the angle of the racking cane relative to the carboy after the position and the angle of the racking cane have been selectively adjusted by the user.

10. The device according to claim 1, wherein the clip component is rotatably adjustable relative to the vertical member of the base component so as to allow the angle of the racking cane to be adjusted by the user.

11. The device according to claim 10, wherein the clip component comprises a C-shaped clip portion and a stem portion attached to the C-shaped clip portion, the C-shaped clip portion of the clip component configured to hold the racking cane therein, and the stem portion of the clip component rotatably coupled to the vertical member of the base component.

12. The device according to claim 11, further comprising a knob component rotatably coupling the stem portion of the clip component to the base component, the knob component configured to fix the angle of the racking cane relative to the carboy after the angle of the racking cane has been selectively adjusted by the user.

13. The device according to claim 1, further comprising a seal member that includes a nipple protruding upwardly from a top surface of a seal body portion and a racking cane aperture disposed through the seal body portion, the nipple of the seal member configured to receive a portion of a tube for conveying a gas used to pressurize the carboy, and the racking cane aperture configured to accommodate the racking cane being inserted therethrough.

14. A device for holding a racking cane, the device comprising:
a base component, the base component configured to be attached to a neck of a carboy, the base component comprising a cylindrical body portion with an outer peripheral surface and an inner peripheral surface;
a clip component coupled to the base component, the clip component configured to hold a racking cane steady relative to the carboy, the clip component being adjustable relative to the base component so as to allow at least one of a position and an angle of the racking cane to be adjusted by a user; and
a tightening knob coupled to the cylindrical body portion of the base component, the tightening knob configured to tighten the cylindrical body portion of the base component against the neck of the carboy so that the device is capable of being securely attached to the carboy;
wherein the base component further comprises one or more notches disposed in a top portion of the cylindrical body portion or one or more slots disposed in a sidewall portion of the cylindrical body portion, the one or more notches or the one or more slots enabling the cylindrical body portion of the base component to flex when the tightening knob is tightened by the user.

15. A device for holding a racking cane, the device comprising:
a base component, the base component attached to a neck of a carboy; and a clip component coupled to the base component, the clip component holding a racking cane steady relative to the carboy, the clip component being adjustable relative to the base component so as to allow at least one of a position and an angle of the racking cane to be adjusted by a user, the clip component comprising a clip portion and a stem portion attached to the clip portion, the clip portion of the clip component holding the racking cane therein, the stem portion extending along an axial length of the clip portion so as to form a rear support for the clip portion, and the stem portion of the clip component adjustably attached to the base component by means of a fastener extending through a fastener aperture in the stem portion.

16. The device according to claim 15, wherein an element of the base component comprises an elongate slot disposed therethrough, the elongate slot enabling the clip component to be slidably adjustable relative to the base component so as to allow the position of the racking cane to be adjusted by the user.

17. The device according to claim 15, wherein the base component comprises a body portion with a downwardly extending protrusion.

18. The device according to claim 17, further comprising a gripper member adjustably coupled to the body portion of the base component, wherein a position of the gripper member is configured to be adjusted by the user such that the device is capable of being clamped onto a portion of the neck of the carboy.

19. The device according to claim 18, further comprising a compressible lining material disposed on at least one of: (i) a gripper surface of the gripper member, and (ii) a gripper surface of the downwardly extending protrusion of the body portion of the base component, the compressible lining material enabling the base component to be securely attached to the neck of the carboy and accommodate any threads disposed on the neck of the carboy.

20. The device according to claim 18, further comprising a tightening knob coupled to the body portion of the base component, the tightening knob configured to tighten the gripper member against the neck of the carboy so that the device is capable of being securely attached to the carboy.

* * * * *